United States Patent
Sakamoto

(10) Patent No.: US 12,406,461 B2
(45) Date of Patent: Sep. 2, 2025

(54) IMAGE PROCESSING APPARATUS

(71) Applicant: SUBARU CORPORATION, Tokyo (JP)

(72) Inventor: Shoma Sakamoto, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 474 days.

(21) Appl. No.: 17/465,017

(22) Filed: Sep. 2, 2021

(65) Prior Publication Data

US 2022/0076045 A1    Mar. 10, 2022

(30) Foreign Application Priority Data

Sep. 7, 2020  (JP) .................. 2020-149643

(51) Int. Cl.
*G06V 20/56*    (2022.01)
*B60R 1/31*    (2022.01)
*G06T 7/593*    (2017.01)
*G06V 10/44*    (2022.01)

(52) U.S. Cl.
CPC ............ *G06V 10/44* (2022.01); *B60R 1/31* (2022.01); *G06T 7/593* (2017.01); *G06V 20/56* (2022.01); *G06T 2207/30252* (2013.01)

(58) Field of Classification Search
CPC ........ G06V 10/40; G06V 10/44; G06T 7/593; G06T 2207/30248; G06T 2207/30252; B60R 1/00; B60R 2300/00
See application file for complete search history.

(56) References Cited

U.S. PATENT DOCUMENTS

| | | | | |
|---|---|---|---|---|
| 6,169,572 | B1* | 1/2001 | Sogawa | G06V 20/58 |
| | | | | 348/113 |
| 2011/0194732 | A1 | 8/2011 | Tsuji | |
| 2014/0254872 | A1* | 9/2014 | Guan | G06V 10/50 |
| | | | | 382/103 |

(Continued)

FOREIGN PATENT DOCUMENTS

| | | |
|---|---|---|
| JP | 2011-165008 A | 8/2011 |
| JP | 2016115084 A * | 6/2016 |

(Continued)

OTHER PUBLICATIONS

Office Action dated Jun. 25, 2024, from corresponding JP Application No. 2020-149643, 5 pages.

*Primary Examiner* — Shaghayegh Azima

(74) *Attorney, Agent, or Firm* — Rimon P.C.

(57) ABSTRACT

An image processing apparatus includes a first extractor, a first object identifier, a region defining unit, a second extractor, a selector, and a second object identifier. The first extractor extracts a first feature quantity included in a captured image. The first object identifier identifies an object on the basis of the first feature quantity. The region defining unit defines an image region in the captured image. The second extractor extracts s a second feature quantity included in an image in the image region. The selector selects, on the basis of data related to the image region defined by the region defining unit, a part of the first feature quantity extracted by the first extractor. The second object identifier identifies the object on the basis of the second feature quantity and the part of the first feature quantity selected by the selector.

10 Claims, 8 Drawing Sheets

(56) References Cited

U.S. PATENT DOCUMENTS

| | | | | |
|---|---|---|---|---|
| 2016/0203602 A1* | 7/2016 | Hayashi | ............... | A61B 1/0638 |
| | | | | 382/128 |
| 2020/0097739 A1* | 3/2020 | Hashimoto | ....... | B60W 30/0956 |
| 2020/0097756 A1* | 3/2020 | Hashimoto | ............ | G06V 10/25 |
| 2021/0097277 A1* | 4/2021 | Hirai | ......................... | G06N 3/08 |
| 2021/0309214 A1* | 10/2021 | Hashimoto | ............ | B60W 30/08 |
| 2022/0230420 A1* | 7/2022 | Cheng | ..................... | G06N 3/045 |
| 2022/0332348 A1* | 10/2022 | Liu | ....................... | B60W 50/00 |

FOREIGN PATENT DOCUMENTS

| | | | |
|---|---|---|---|
| JP | 2019-139618 A | | 8/2019 |
| JP | 2019-204338 A | | 11/2019 |
| JP | 2020-024562 A | | 2/2020 |
| JP | 2021079762 A | * | 5/2021 |

* cited by examiner

IMAGE PROCESSING APPARATUS

CROSS-REFERENCE TO RELATED APPLICATIONS

The present application claims priority from Japanese Patent Application No. 2020-149643 filed on Sep. 7, 2020, the entire contents of which are hereby incorporated by reference.

BACKGROUND

The technology relates to an image processing apparatus that identifies an object on the basis of a captured image obtained by an imaging apparatus.

A captured image obtained by an imaging apparatus includes images of various objects. For example, Japanese Unexamined Patent Application Publication No. 2011-165008 discloses an image recognition apparatus that identifies a subject.

SUMMARY

An aspect of the technology provides an image processing apparatus including a first extractor, a first object identifier, a region defining unit, a second extractor, a selector, and a second object identifier. The first extractor is configured to extract a first feature quantity included in a captured image. The first object identifier is configured to identify an object on the basis of the first feature quantity. The region defining unit is configured to define an image region in the captured image. The second extractor is configured to extract a second feature quantity included in an image in the image region. The selector is configured to select, on the basis of information related to the image region defined by the region defining unit, a part of the first feature quantity extracted by the first extractor. The second object identifier is configured to identify the object on the basis of the second feature quantity and the part of the first feature quantity selected by the selector.

An aspect of the technology provides an image processing apparatus including circuitry configured to: extract a first feature quantity included in a captured image; identify an object on the basis of the first feature quantity; define an image region in the captured image; extract a second feature quantity included in an image in the image region; select, on the basis of information related to the image region defined, a part of the first feature quantity extracted; and identify the object on the basis of the second feature quantity and the selected part of the first feature quantity.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

What is desired of an image processing apparatus that identifies an object is to reduce the amount of computation while enhancing accuracy of identification. Such an image processing apparatus is expected to achieve further reduction in the amount of computation.

It is desirable to provide an image processing apparatus that makes it possible to reduce the amount of computation.

Some example embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale. Throughout the present specification and the drawings, elements having substantially the same function and configuration are denoted with the same numerals to avoid any redundant description.

Example Embodiment

Configuration Example

Figure 1:
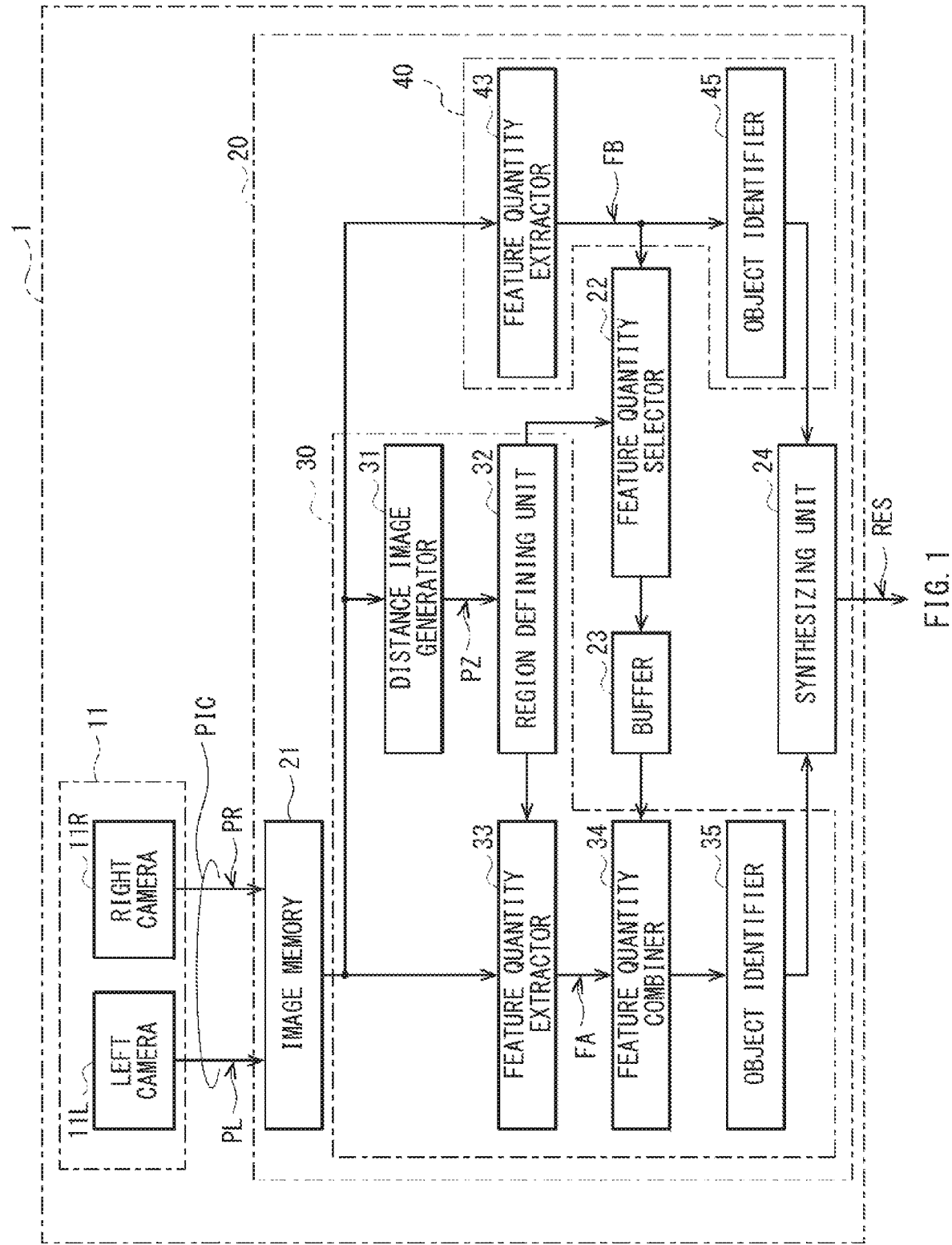
FIG. 1 is a block diagram illustrating a configuration example of an image processing apparatus according to one example embodiment of the technology.

FIG. 1 illustrates a configuration example of an image processing apparatus 1 according to an example embodiment of the technology. The image processing apparatus 1 may include a stereo camera 11 and a processor 20. The image processing apparatus 1 may be mounted on a vehicle 10. The vehicle 10 may be an automobile, for example.

The stereo camera 11 may capture images of an environment in front of the vehicle 10 to thereby generate a pair of images. The pair of images may be a left image PL and a right image PR having different parallaxes. The stereo camera 11 may include a left camera 11L and a right camera 11R. The left camera 11L and the right camera 11R may include respective lenses and respective image sensors. For example, the left camera 11L and the right camera 11R may be disposed in the vicinity of an inner upper part of the front windshield of the vehicle 10 and spaced from each other by a predetermined distance in the width direction of the vehicle 10. The left camera 11L and the right camera 11R may perform imaging operations in synchronization with each other. The left camera 11L may generate the left image PL, and the right camera 11R may generate the right image PR. The left image PL may include a plurality of pixel values, and the right image PR may include a plurality of pixel values. The left image PL and the right image PR may constitute a stereo image PIC.

Figure 2:
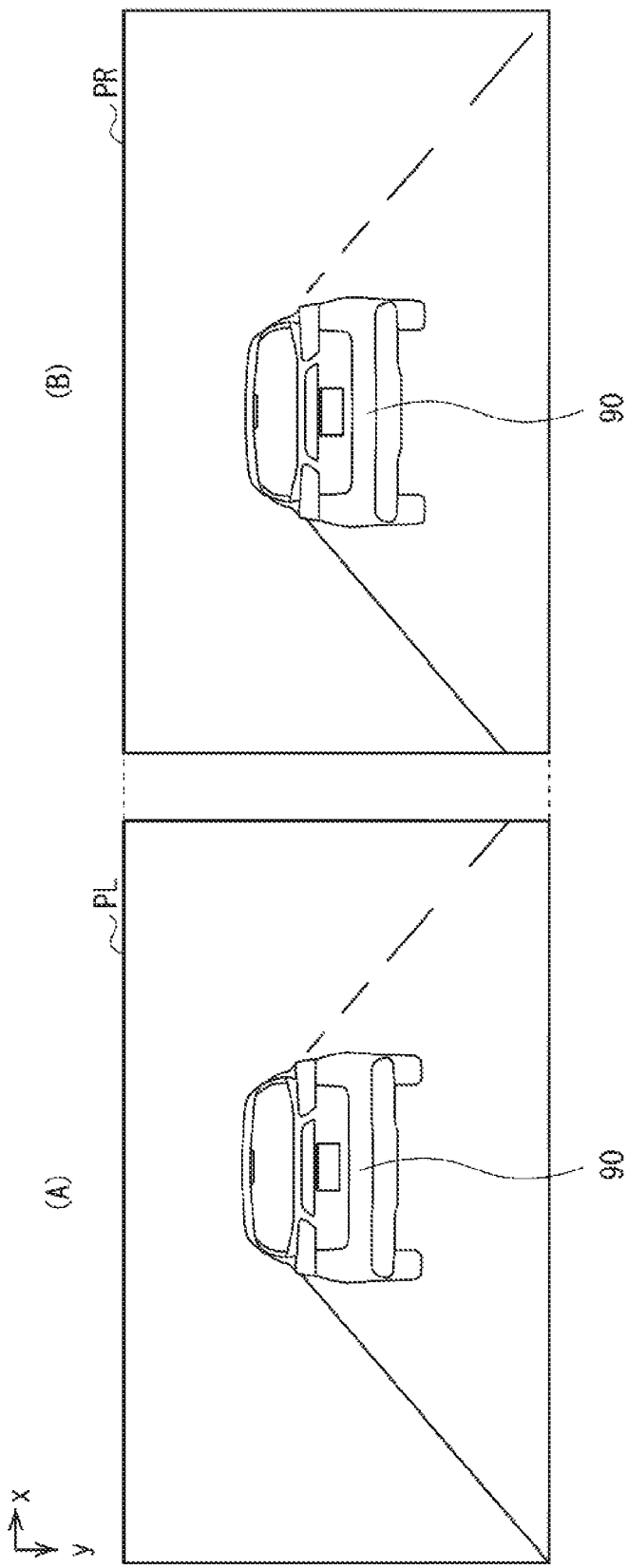
FIG. 2 is an explanatory diagram illustrating examples of left and right images generated by a stereo camera in the image processing apparatus of FIG. 1.

FIG. 2 illustrates an example of the stereo image PIC. Part (A) of FIG. 2 illustrates an example of the left image PL, and part (B) of FIG. 2 illustrates an example of the right image PR. In this example, another vehicle (e.g., a preceding vehicle 90) is traveling ahead of the vehicle 10 on a road on which the vehicle 10 is traveling. The left camera 11L may capture an image of the preceding vehicle 90 to generate the left image PL. The right camera 11R may capture an image of the preceding vehicle 90 to generate the right image PR.

The stereo camera 11 may generate the stereo image PIC including the left image PL and the right image PR as described above. The stereo camera 11 may perform the imaging operation at a predetermined frame rate, such as 60 fps, to generate a series of stereo images PIC.

The processor 20 illustrated in FIG. 1 may identify an object present in front of the vehicle 10 on the basis of the stereo images PIC supplied from the stereo camera 11. On the basis of data related to the object identified by the processor 20, for example, traveling control may be performed on the vehicle 10 or the information related to the identified object may be displayed on a console monitor in the vehicle 10. The processor 20 may include a central processing unit (CPU) that executes programs, a access random memory (RAM) that temporarily stores processing data, and a read only memory (ROM) that stores programs, for example. The processor 20 may include an image memory 21, an identifier 30, an identifier 40, a feature quantity selector 22, a buffer 23, and a synthesizing unit 24.

The image memory 21 may temporarily store the left image PL and the right image PR included in the stereo image PIC. The image memory 21 may supply the left image PL and the right image PR stored therein to the identifiers 30 and 40 sequentially.

The identifier 30 may define one or more image regions R on the basis of the left image PL and the right image PR read from the image memory 21, and identify an object in an image in each of the one or more image regions R. For example, the identifier 30 may use a trained deep neural network (DNN) model to identify the object in the image in each of the image regions R, and may thereby assign a category indicating what the object corresponds to each of the image regions R. The image regions R may be rectangular regions. The identifier 30 may include a distance image generator 31, a region defining unit 32, a feature quantity extractor 33, a feature quantity combiner 34, and an object identifier 35.

The distance image generator 31 may generate a distance image PZ by performing predetermined image processing, including stereo matching and filtering, on the basis of the left image PL and the right image PR read from the image memory 21. The distance image PZ may include a plurality of pixel values. In this example, each of the pixel values may be a parallax value. In other words, each of the pixel values may correspond to a distance to a point corresponding to a corresponding one of the pixels in a three-dimensional real space. Note that this is a non-limiting example. Alternatively, for example, each of the pixel values may be a distance value indicating the distance to a point corresponding to a corresponding one of the pixels in the three-dimensional real space.

The region defining unit 32 may define one or more image regions R on the basis of the distance image PZ. For example, on the basis of the distance image PZ, the region defining unit 32 may identify pixels that are located close to each other in the image and that are substantially the same in parallax value, and may define a rectangular region including those pixels as the image region R. That is, in a case where any object is present, pixels in a region corresponding to the object in the distance image PZ are located close to each other and are substantially the same in parallax value. In such a manner, the region defining unit 32 may define the image region R to enclose the object.

Figure 3:
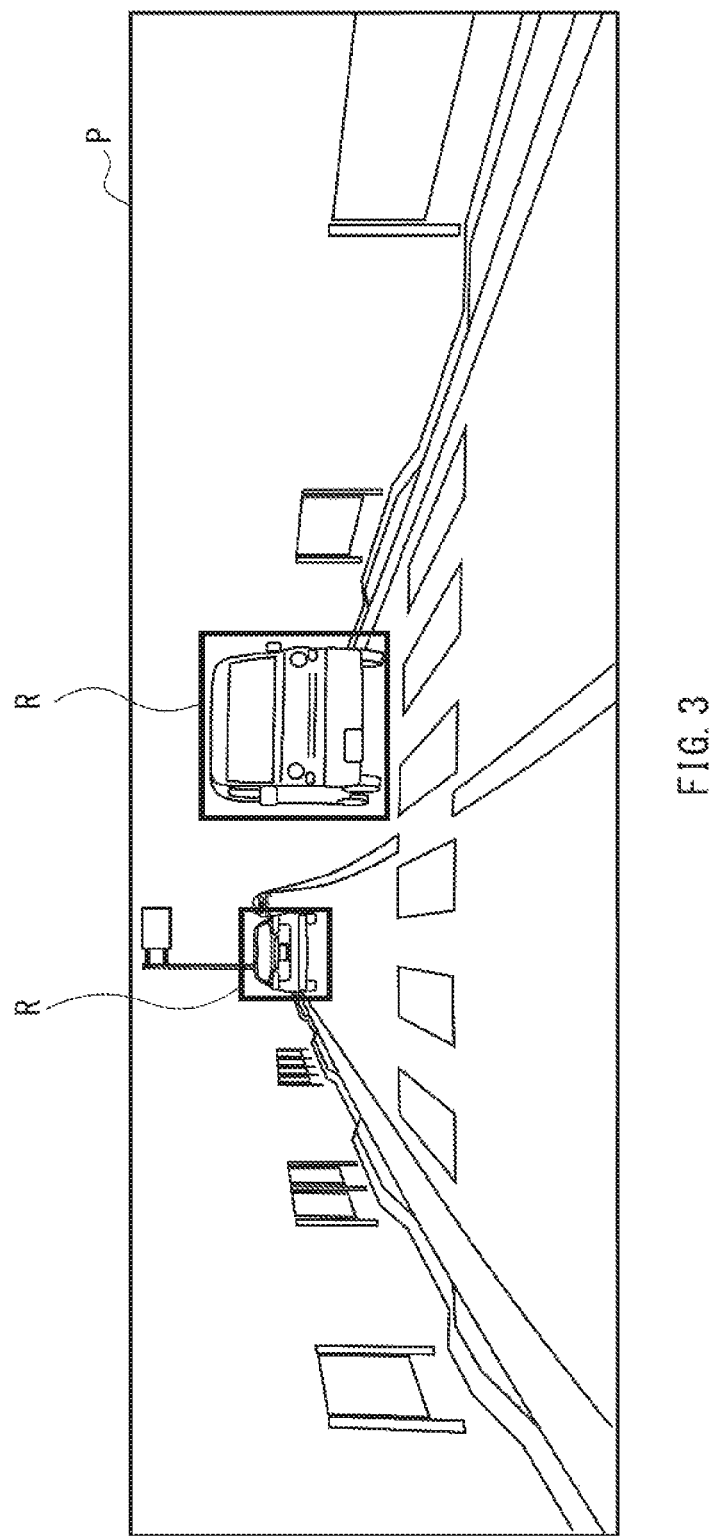
FIG. 3 is an explanatory diagram illustrating examples of an image region defined by a region defining unit illustrated in FIG. 1.

FIG. 3 illustrates an example of an image P that is one of the left image PL and the right image PR. In this example, two image regions R are defined for two vehicles, respectively. Although the region defining unit 32 defines the image regions R for vehicles in this example, this is non-limiting. For example, the region defining unit 32 may define the image regions R for other objects including, without limitation, humans, guardrails, and walls. The region defining unit 32 may supply data related to the defined one or more image regions R to the feature quantity extractor 33 and the feature quantity selector 22.

On the basis of the image in each of the one or more image regions R in the image P, i.e., one of the left image PL and the right image PR, for example, the feature quantity extractor 33 illustrated in FIG. 1 may extract a feature quantity FA included in the image. The feature quantity extractor 33 may use a trained DNN model to extract the feature quantity FA.

Figure 4:
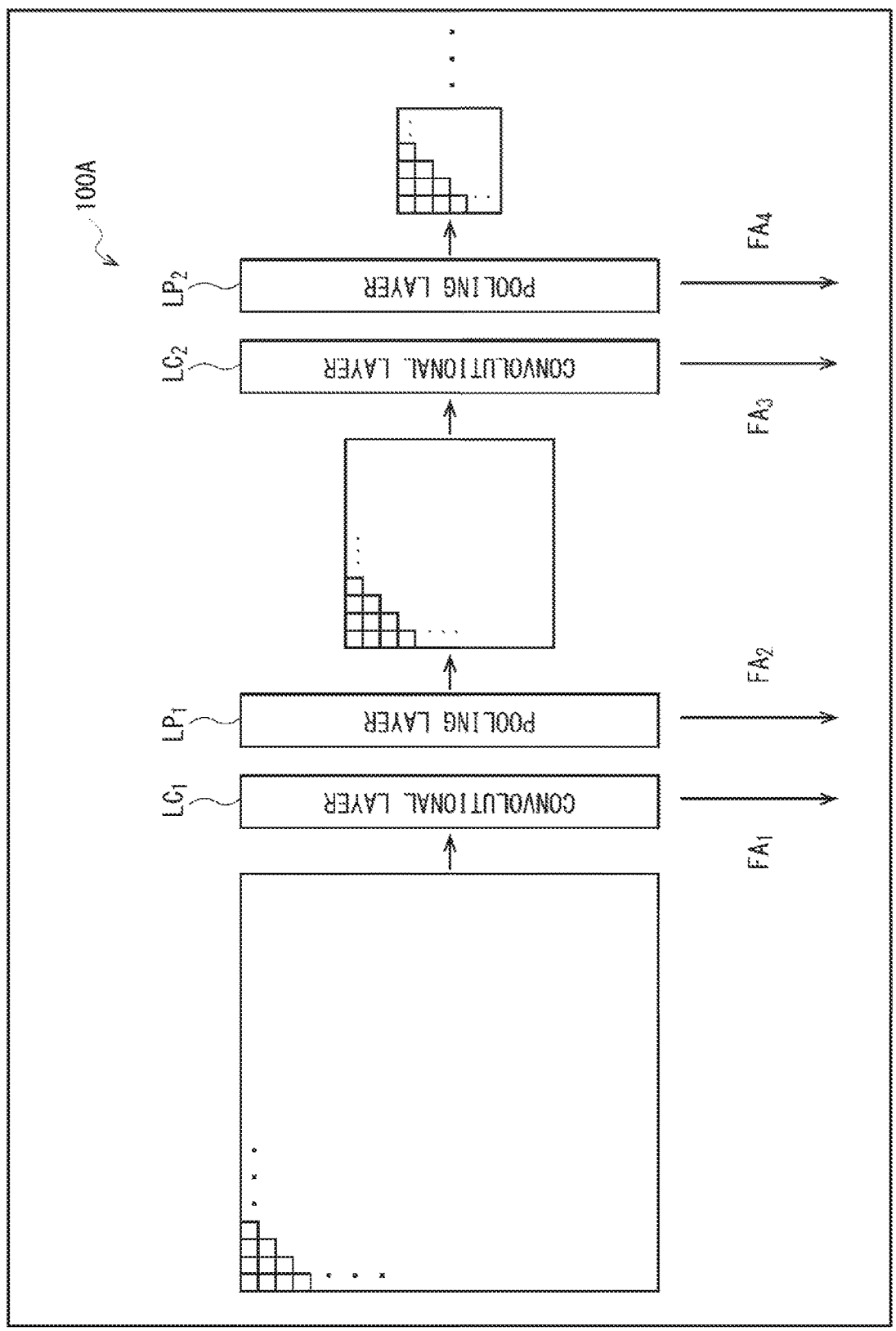
FIG. 4 is an explanatory diagram illustrating a configuration example of a neural network in one of feature quantity extractors illustrated in FIG. 1.

FIG. 4 schematically illustrates a configuration example of a neural network 100A in the feature quantity extractor 33. The neural network 100A may include a plurality (N) of convolutional layers LC, i.e., convolutional layers $LC_1$ to $LC_N$, and a plurality (N) of pooling layers LP, i.e., pooling layers $LP_1$ to $LP_N$. The convolutional layers LC and the pooling layers LP may be disposed alternately.

The feature quantity extractor 33 may first input the image in the image region R to the neural network 100A. On the basis of the inputted image, the feature quantity extractor 33 may perform a convolution process using the convolutional layer $LC_1$ and a pooling process using the pooling layer $LP_1$.

Figure 5A:
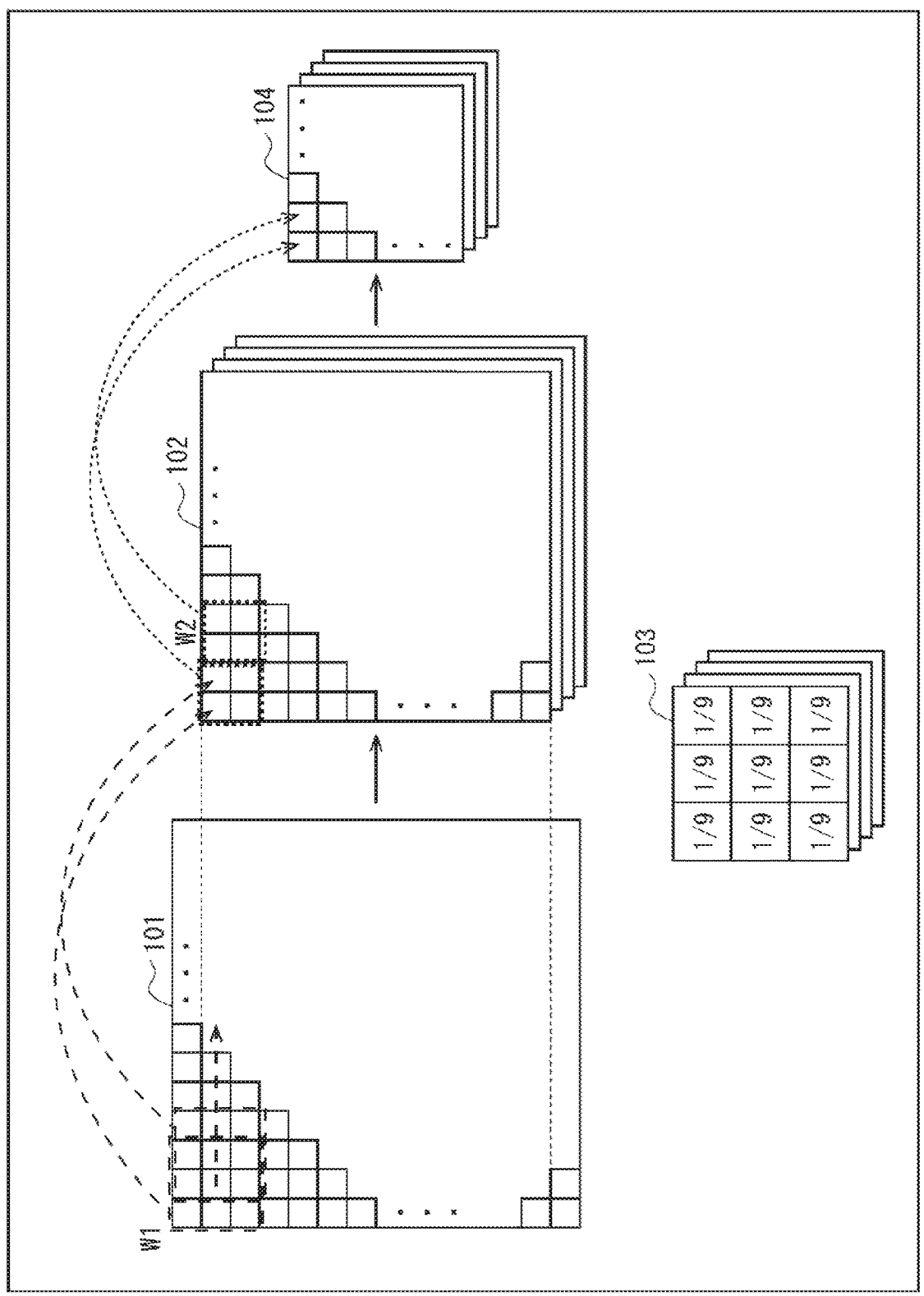
FIG. 5A is an explanatory diagram illustrating an operation example of the feature quantity extractors illustrated in FIG. 1.
Figure 5B:
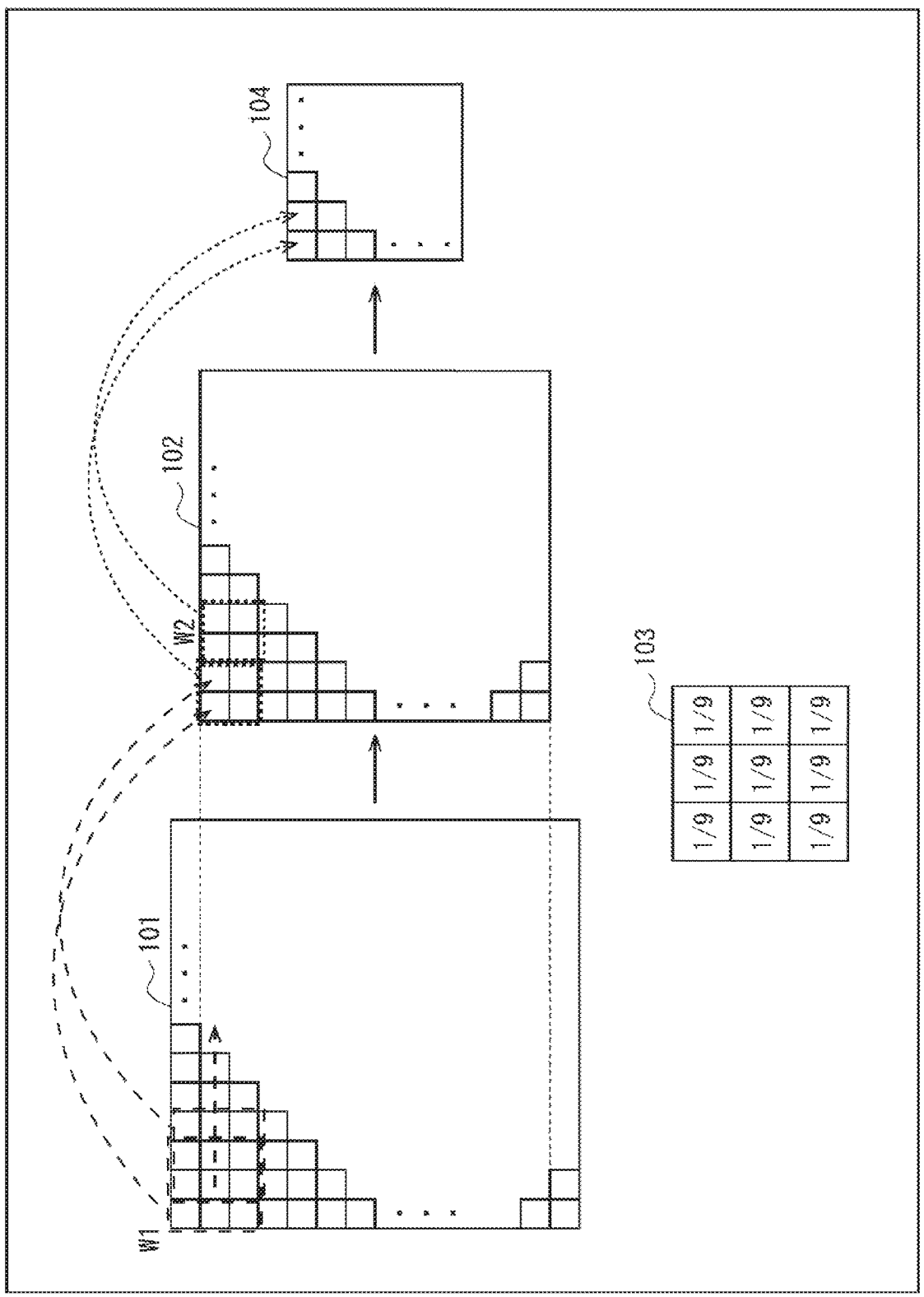
FIG. 5B is an explanatory diagram illustrating an operation example of the feature quantity extractors illustrated in FIG. 1.

FIGS. 5A and 5B illustrate examples of the convolution process by the convolutional layer $LC_1$ and the pooling process by the pooling layer $LP_1$.

First, the feature quantity extractor 33 may perform the convolution process on the basis of image data 101. For example, the feature quantity extractor 33 may define a region W1 having a predetermined size in the image data 101. In this example, the predetermined size may be three pixels by three pixels. Thereafter, the feature quantity extractor 33 may perform weighted addition of the nine pixel values in this region W1, with nine filter values in a filter 103 as weighting coefficients, to thereby calculate pixel values in image data 102. In this example, the nine filter values in the filter 103 may each be "⅑"; however, this is a non-limiting example. The nine filter values may be generated in advance by machine learning. The feature quantity extractor 33 may define a plurality of regions W1 one by one by shifting the last defined region W1 by one pixel over the image data 101, and may perform the weighted addition for each of the defined regions W1 to thereby calculate pixel values. In such a manner, the feature quantity extractor 33 may generate the image data 102.

In the example of FIG. 5A, for example, the feature quantity extractor 33 may generate a plurality of pieces of image data 102 (in this example, four pieces of image data 102) using a plurality of filters 103 (in this example, four filters 103) different from each other, respectively. In this case, a plurality of pixel values in each of the pieces of image data 102 may be a feature quantity $FA_1$. In the example of FIG. 5B, the feature quantity extractor 33 may generate a single piece of image data 102 using a single filter 103, for example. In this case, a plurality of pixel values in the single piece of image data 102 may be the feature quantity $FA_1$.

Thereafter, the feature quantity extractor 33 may perform the pooling process on the basis of the image data 102 generated by performing the convolution process. For example, the feature quantity extractor 33 may define a region W2 having a predetermined size in the image data 102. In this example, the predetermined size may be two pixels by two pixels. The feature quantity extractor 33 may thereafter select the largest pixel value of the four pixel values in the region W2, and take this pixel value as a pixel value in image data 104. The feature quantity extractor 33 may define a plurality of regions W2 one by one in the image data 102 and select the largest pixel value in each of the defined regions W2. In such a manner, the feature quantity extractor 33 may generate the image data 104.

In the example of FIG. 5A, for example, the feature quantity extractor 33 may generate a plurality of pieces of image data 104 (in this example, four pieces of image data 104) on the basis of the plurality of pieces of image data 102 (in this example, the four pieces of image data 102), respectively. In this case, a plurality of pixel values in each of the pieces of image data 104 may be a feature quantity $FA_2$. In the example of FIG. 5B, the feature quantity extractor 33 may generate a single piece of image data 104 on the basis of the single piece of image data 102, for example. In this case, a plurality of pixel values in the single piece of image data 104 may be the feature quantity $FA_2$.

Performing one set of the convolution and pooling processes in such a manner reduces the number of the pixels in the image data to about one quarter the original number in this example. The feature quantity extractor 33 may repeat the convolution and pooling processes a plurality (N) of times, as illustrated in FIG. 4. The feature quantity extractor 33 may perform N convolution processes using, for example, the filters 103 different from each other. The number of the filters 103 to be used in each of the N convolution processes may be selected individually. In a case where the image in the image region R corresponds to a vehicle, performing the convolution process a plurality of times in such a manner causes the image data to include features of the vehicle, such as a clearer outline of the vehicle. A plurality of pixel values of image data generated by the feature quantity extractor 33 performing the convolution process first may be the feature quantity $FA_1$. A plurality of pixel values of image data generated by subsequently performing the pooling process may be the feature quantity $FA_2$. A plurality of pixel values of image data generated by subsequently performing the convolution process may be a feature quantity $FA_3$. A plurality of pixel values of image data generated by subsequently performing the pooling process may be a feature quantity $FA_4$, and so on. In such a manner, the feature quantity extractor 33 may extract the plurality of feature quantities $FA_1$, $FA_2$, $FA_3$, $FA_4$, . . . as the feature quantity FA. In this example, the result of all of the convolution processes and pooling processes may be used as the feature quantity FA; however, this is a non-limiting example. Alternatively, the result of some of the convolution processes and pooling processes may be used as the feature quantity FA. For example, only the result of the final, i.e., the N-th convolution and pooling processes may be used as the feature quantity FA.

The feature quantity combiner 34 illustrated in FIG. 1 may combine the feature quantity FA extracted by the feature quantity extractor 33 and a feature quantity supplied from the identifier 40 via the feature quantity selector 22 and the buffer 23.

The object identifier 35 may identify the object in each of the one or more image regions R on the basis of a combined feature quantity resulting from the combining by the feature quantity combiner 34. For example, in a case where the image in the image region R represents a vehicle, the feature quantity includes the features of the vehicle; and in a case where the image in the image region R represents a human, the feature quantity includes the features of the human. The object identifier 35 is therefore able to identify the object in each of the image regions R on the basis of the feature quantity. Thereafter, the object identifier 35 may assign a category indicating what the object corresponds to each of the image regions R. For example, in a case where the object in the image in any of the image regions R corresponds to a vehicle, the object identifier 35 may assign a category representing a vehicle to that image region R. In a case where the object in the image in any of the image regions R corresponds to a human, the object identifier 35 may assign a category representing a human to that image region R.

The identifier 40 may identify the object in the image P, which is one of the left image PL and the right image PR, for example, read from the image memory 21. For example, as with the identifier 30, the identifier 40 may use a trained DNN model to identify the object in the image P, i.e., a full image. Thereafter, the identifier 40 may perform a process of so-called semantic segmentation to thereby assign to each pixel in the image P a label indicating what object the image to which the pixel belongs corresponds to. The identifier 40 may include a feature quantity extractor 43 and an object identifier 45.

The feature quantity extractor 43 may extract a feature quantity FB included in the image P, which is one of the left image PL or the right image PR, for example. As with the feature quantity extractor 33 of the identifier 30, the feature quantity extractor 43 may use a trained DNN model to extract the feature quantity FB. As with the neural network 100A (FIG. 4) in the feature quantity extractor 33, a neural network 100B in the feature quantity extractor 43 may include a plurality (M) of convolutional layers LC, i.e., convolutional layers $LC_1$ to $LC_M$, and a plurality (M) of pooling layers LP, i.e., pooling layers $LP_1$ to $LP_M$.

The feature quantity extractor 43 may first scale down the image P, i.e., the full image by half in each of a horizontal direction and a vertical direction, for example, and may input the scaled-down image to the neural network 100B. Thereafter, the feature quantity extractor 43 may repeat the convolution and pooling processes a plurality (M) of times, as with the feature quantity extractor 33 (FIG. 4). In such a manner, the feature quantity extractor 43 may extract a plurality of feature quantities $FB_1$, $FB_2$, $FB_3$, $FB_4$, . . . as the feature quantity FB. In this example, the result of all of the convolution processes and pooling processes may be used as the feature quantity FB; however, this is a non-limiting example. Alternatively, the result of some of the convolution processes and pooling processes may be used as the feature quantity FB.

The object identifier 45 may identify the object in the image P on the basis of the feature quantity FB. Thereafter, on the basis of the identification result, the object identifier 45 may assign to each pixel in the image P a label indicating what object the image to which the pixel belongs corresponds to. For example, in a case where a pixel belongs to an image of a vehicle, the object identifier 45 may assign to the pixel a label indicating that the pixel belongs to an image of a vehicle. In a case where a pixel belongs to an image of a human, the object identifier 45 may assign to the pixel a label indicating that the pixel belongs to an image of a human. In a case where a pixel belongs to an image of a ground such as a road, the object identifier 45 may assign to the pixel a label indicating that the pixel belongs to an image of a ground.

On the basis of data related to the one or more image regions R supplied from the region defining unit 32, the feature quantity selector 22 selects a part of the feature quantity FB as a feature quantity to be supplied to the identifier 30. For example, the feature quantity selector 22 may select the part of the feature quantity FB to be supplied to the identifier 30 on the basis of respective locations of the one or more image regions R in the image P or parallax values in the one or more image regions R in the distance image PZ.

The buffer 23 may temporarily store the feature quantity supplied from the feature quantity selector 22. The buffer 23 may supply the stored feature quantity to the feature quantity combiner 34 of the identifier 30.

The synthesizing unit 24 may synthesize the result of the processes performed by the object identifier 35 of the identifier 30 and the result of the processes performed by the object identifier 45 of the identifier 40, and may output a synthesized result of the processes as an identification result RES.

With such a configuration, in the image processing apparatus 1, the identifier 40 may identify the object on the basis of the image P, i.e., a full image, and the identifier 30 may identify the object on the basis of one or more images in the one or more image regions R defined by the region defining unit 32. In the course of this process, in the image processing apparatus 1, the feature quantity selector 22 may supply a part of the feature quantity FB extracted by the identifier 40 to the identifier 30 via the buffer 23. The image processing apparatus 1 thus allows the feature quantity FB extracted by the identifier 40 to be used also by the identifier 30 in part, thereby achieving a reduction in the amount of computation. This allows for effective use of limited computational resources in performing the identifying process.

In one embodiment, the feature quantity extractor 43 may serve as a "first extractor". In one embodiment, the feature quantity FB may serve as a "first feature quantity". In one embodiment, the object identifier 45 may serve as a "first object identifier". In one embodiment, the region defining unit 32 may serve as a "region defining unit". In one embodiment, the image region R may serve as an "image region". In one embodiment, the feature quantity extractor 33 may serve as a "second extractor". In one embodiment, the feature quantity FA may serve as a "second feature quantity". In one embodiment, the feature quantity selector 22 may serve as a "selector". In one embodiment, the object identifier 35 may serve as a "second object identifier". In one embodiment, the plurality of feature quantities $FB_1$, $FB_2$, $FB_3$, $FB_4$, . . . may serve as "a plurality of partial feature quantities".

Example Workings and Effects

Example workings and effects of the image processing apparatus 1 according to the example embodiment of the technology will now be described.

Outline of Overall Operation

First, an outline of an overall operation of the image processing apparatus 1 will be described with reference to FIG. 1. The stereo camera 11 may capture images of the environment in front of the vehicle 10 to generate the stereo image PIC including the left image PL and the right image PR. The image memory 21 in the processor 20 may temporarily store the left image PL and the right image PR included in the stereo image PIC. The identifier 40 may identify the object in the image P, i.e., one of the left image PL and the right image PR, for example, read from the image memory 21. For example, the identifier 40 may use a trained DNN model to identify the object in the image P, which is a full image. Thereafter, the identifier 40 may perform the process of so-called semantic segmentation to thereby assign to each pixel in the image P a label indicating what object the image to which the pixel belongs corresponds to. On the basis of the left image PL and the right image PR read from the image memory 21, the identifier 30 may define one or more image regions R and identify the object in the image in each of the one or more image regions R. For example, the identifier 30 may use a trained DNN model to identify the object in the image in each of the image regions R, which may be rectangular regions, and may assign a category indicating what the object corresponds to each of the image regions R. The synthesizing unit 24 may synthesize the result of the processes performed by the object identifier 35 in the identifier 30 and the result of the processes performed by the object identifier 45 in the identifier 40, and may output the synthesized result of the processes as the identification result RES.

Details of Operation

An operation example of the processor 20 illustrated in FIG. 1 will now be described in detail.

In the identifier 40 of the processor 20, the feature quantity extractor 43 may extract the feature quantity FB included in the image P, which is one of the left image PL and the right image PR, for example. For example, the feature quantity extractor 43 may scale down the image P, i.e., a full image, and input the scaled-down image to the neural network 100B. The feature quantity extractor 43 may then repeat the convolution and pooling processes a plurality (M) of times to thereby extract the plurality of feature quantities $FB_1$, $FB_2$, $FB_3$, $FB_4$, . . . as the feature quantity FB. The object identifier 45 identifies the object in the image P on the basis of the feature quantity FB. Thereafter, the object identifier 45 may perform the process of so-called semantic segmentation to thereby assign to each pixel in the image P a label indicating what object the image to which the pixel belongs corresponds to.

The distance image generator 31 in the identifier 30 may generate the distance image PZ by performing predetermined image processing, including stereo matching and filtering, on the basis of the left image PL and the right image PR read from the image memory 21. The region defining unit 32 may define one or more image regions R on the basis of the distance image PZ. For example, on the basis of the distance image PZ, the region defining unit 32 may identify pixels that are located close to each other in the image and that are substantially the same in parallax value, and may define a region including those pixels as the image region R. On the basis of the image in each of the one or more image regions R in the image P, the feature quantity extractor 33 may extract the feature quantity FA included in the image. For example, the feature quantity extractor 33 may input the image in the image region R to the neural network 100A and repeat the convolution and pooling processes a plurality (N) of times to thereby extract the plurality of feature quantities $FA_1$, $FA_2$, $FA_3$, $FA_4$, . . . as the feature quantity FA.

On the basis of data related to the one or more image regions R supplied from the region defining unit 32, the feature quantity selector 22 selects a part of the feature quantity FB extracted by the feature quantity extractor 43 as a feature quantity to be supplied to the identifier 30. For example, the feature quantity selector 22 may select the part of the feature quantity FB to be supplied to the identifier 30 on the basis of data such as the respective locations of the one or more image regions R in the image P or the parallax values in the one or more image regions R in the distance image PZ. For example, on the basis of the location of each of the one or more image regions R, the feature quantity selector 22 may select a feature quantity of a region corresponding to that image region R, as the part of the feature quantity FB. Because the feature quantity FB may be image data as illustrated in FIGS. 4, 5A, and 5B, it is possible for the feature quantity selector 22 to select the feature quantity of the region corresponding to the image region R. Alternatively, for example, on the basis of the parallax value in each of the one or more image regions R, the feature quantity selector 22 may select, from among the feature quantities $FB_1$, $FB_2$, $FB_3$, $FB_4$, . . . , a feature quantity in which the feature of the object in the image in the image region R markedly appears. For example, in a case where the parallax value is small, the distance to the object is great and accordingly, performing the convolution and pooling processes many times can collapse the image. To avoid this, the feature quantity selector 22 may avoid selecting later ones of the feature quantities $FB_1$, $FB_2$, $FB_3$, $FB_4$, . . . .

The buffer 23 may temporarily store the feature quantity supplied from the feature quantity selector 22. The buffer 23 may supply the stored feature quantity to the feature quantity combiner 34 of the identifier 30.

In the identifier 30, the feature quantity combiner 34 may combine the feature quantity FA extracted by the feature quantity extractor 33 and the feature quantity supplied from the identifier 40 via the feature quantity selector 22 and the buffer 23. On the basis of a combined feature quantity resulting from the combining by the feature quantity combiner 34, the object identifier 35 may identify the object in each of the one or more image regions R. Thereafter, the object identifier 35 may assign a category indicating what the object corresponds to each of the one or more image regions R.

The synthesizing unit 24 may synthesize the result of the processes performed the object identifier 35 in the identifier 30 and the result of the processes performed by the object identifier 45 in the identifier 40, and may output the synthesized result of the processes as the identification result RES.

As described above, in the image processing apparatus 1, the feature quantity extractor 43 extracts the feature quantity FB included in the image P, and the feature quantity extractor 33 extracts the feature quantity FA included in the image in the image region R. It is thus possible to identify the object on the basis of the image P, which is a full image, and also identify the object on the basis of the image in the image region R. This makes it possible to reduce the amount of computation while enhancing the accuracy of identification. For example, in a case of only identifying the object on the basis of the image P, i.e., a full image, the accuracy of identification can be lower because it is difficult to analyze the full image in detail and in real time due to the limited computational resources. In particular, in a case of scaling down the full image P to reduce the amount of computation and performing the convolution and pooling processes a plurality of times on the basis of the scaled-down image, as with the processes to be performed by the feature quantity extractor 43, for example, a collapse of an image of a distant object can result, making it difficult to identify such an object. In contrast, the image processing apparatus 1 identifies the object on the basis of the full image P and also identifies the object on the basis of the image in each of the one or more image regions R. According to the image processing apparatus 1, it is thus possible to identify a distant object independently by defining the image region R for the distant object, for example. This makes it possible to reduce the amount of computation while enhancing the accuracy of identification.

Further, in the image processing apparatus 1, the feature quantity extractor 43 extracts the feature quantity FB included in the image P, the feature quantity extractor 33 extracts the feature quantity FA included in the image in the image region R, and the object identifier 35 identifies the object in the image region R on the basis of the feature quantity FA and a part of the feature quantity FB. The image processing apparatus 1 thus allows the object identifier 35 to use the feature quantity FB in part as well as the feature quantity FA to identify the object. This makes it possible to reduce the amount of computation while enhancing the accuracy of identification. As a result, the image processing apparatus 1 allows for effective use of the limited computational resources in identifying the object.

Further, in the image processing apparatus 1, the feature quantity selector 22 selects the part of the feature quantity FB on the basis of the data related to the image region R defined by the region defining unit 32. This allows the identifier 30 to be selectively supplied with a feature quantity that is able to improve the accuracy of identification at the identifier 30, and not to be supplied with any feature quantity that does not contribute to improved accuracy of identification. The image processing apparatus 1 thereby makes it possible to reduce the amount of computation at the identifier 30.

Example Effects

According to the example embodiment described above, the feature quantity included in the image P is extracted and also the feature quantity included in the image in the image region is extracted. This makes it possible to reduce the amount of computation while enhancing the accuracy of identification. According to the example embodiment, the feature quantity FB included in the image P is extracted, and also the feature quantity FA included in the image in the image region is extracted. The object in the image region is then identified on the basis of the feature quantity FA and a part of the feature quantity FB. This makes it possible to reduce the amount of computation while enhancing the accuracy of identification.

According to the example embodiment, the part of the feature quantity FB is selected on the basis of the data related to the image region defined by the region defining unit. This allows the amount of computation to be low.

Modification Example 1

In the example embodiment described above, the object identifier 45 of the identifier 40 identifies the object on the basis of the feature quantity FB extracted by the feature quantity extractor 43; however, this is a non-limiting example. Instead of this, the object identifier 45 may identify the object on the basis of a feature quantity that is a part of the feature quantity FB other than the part to be supplied to the identifier 30. The present modification example will be described in detail below.

Figure 6:
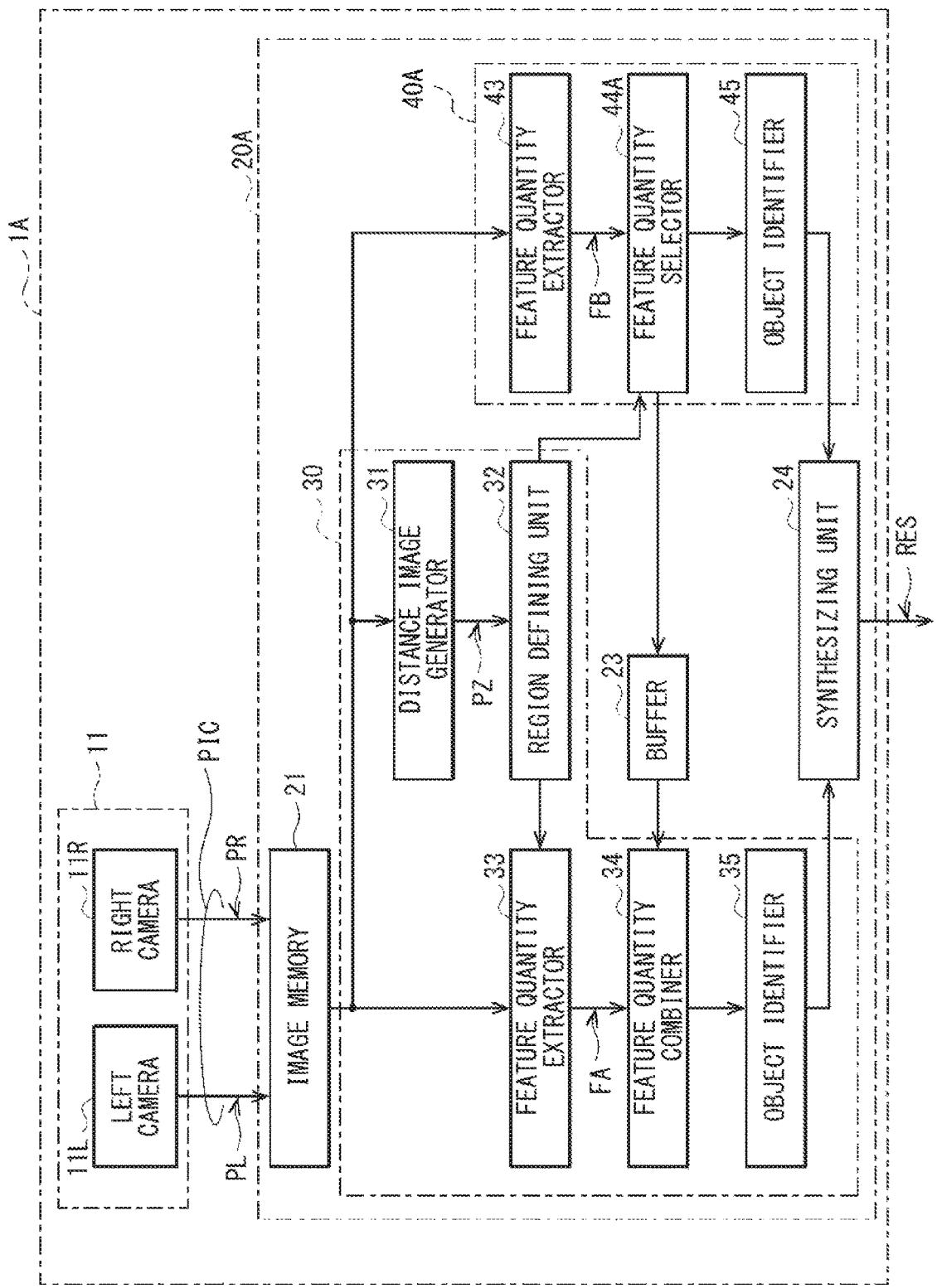
FIG. 6 is a block diagram illustrating a configuration example of an image processing apparatus according to one modification example.

FIG. 6 illustrates a configuration example of an image processing apparatus 1A according to the present modification example. The image processing apparatus 1A may include a processor 20A. The processor 20A may include an identifier 40A. The identifier 40A may include a feature quantity selector 44A. As with the feature quantity selector 22 according to the example embodiment described above, the feature quantity selector 44A selects, on the basis of the data related to the one or more image regions R supplied from the region defining unit 32, a feature quantity that is a part of the feature quantity FB to be supplied to the identifier 30. Further, the feature quantity selector 44A may supply to the object identifier 45 a feature quantity that is a part of the feature quantity FB other than the part to be supplied to the identifier 30. The object identifier 45 may thus identify the object on the basis of the feature quantity that is a part of the feature quantity FB other than the part to be supplied to the identifier 30. In other words, the object identifier 45 does not have to perform a process based on the same feature quantity as that to be supplied to the identifier 30. This reduces the amount of computation at the object identifier 45.

Modification Example 2

In the example embodiment described above, the region defining unit 32 may define one or more image regions R on the basis of the distance image PZ; however, this is a non-limiting example. Instead of this, the region defining unit may define one or more image regions R on the basis of traveling data of the vehicle 10, for example. The present modification example will be described in detail below.

Figure 7:
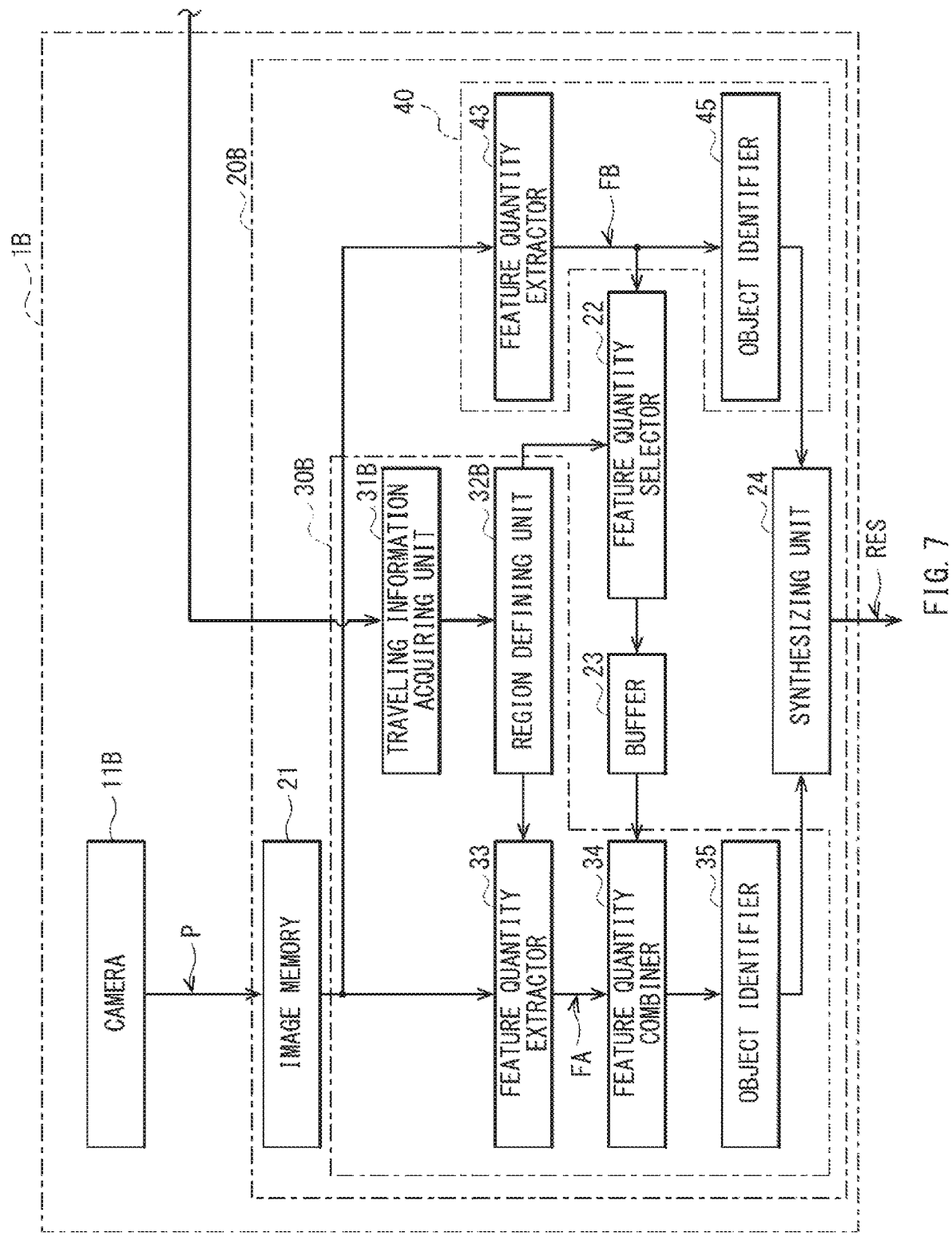
FIG. 7 is a block diagram illustrating a configuration example of an image processing apparatus according to another modification example.

FIG. 7 illustrates a configuration example of an image processing apparatus 1B according to the present modification example. The image processing apparatus 1B may include a camera 11B and a processor 20B.

The camera 11B may include a lens and an image sensor, and may generate the image P. While the example embodiment described above may use a stereo camera, the present modification example may use a monocular camera.

The processor 20B may include an identifier 30B. The identifier 30B may include a traveling data acquiring unit 31B and a region defining unit 32B.

The traveling data acquiring unit 31B may acquire the traveling data of the vehicle 10 from, for example, a vehicle control apparatus of the vehicle 10 via a controller area network (CAN). Examples of the traveling data may include a traveling speed and a yaw rate of the vehicle 10.

On the basis of the traveling data acquired by the traveling data acquiring unit 31B, the region defining unit 32B may estimate a course of the vehicle 10 to thereby define one or more image regions R. For example, on the basis of the traveling data of the vehicle 10, the region defining unit 32B may estimate how far and in what direction the vehicle 10 will travel, and may identify a region in which the vehicle 10 is to travel in the image P to thereby define the one or more image regions R in the vicinity of the identified region. For example, at a location in the image P near the region in which the vehicle 10 is to travel, there is a greater need to identify an object in order to avoid collision with the vehicle 10. In contrast, at a location in the image P apart from the region in which the vehicle 10 is to travel, there is less need to identify an object because of low possibility of collision of the vehicle 10. The region defining unit 32B may therefore define, in the image P, the one or more image regions R in the vicinity of the region in which the vehicle 10 is to travel.

Such a configuration also makes it possible to achieve effects similar to those obtained with the example embodiment described above.

Some example embodiments of the technology are described in detail above with reference to the accompanying drawings. It should be appreciated that the example embodiments of the technology described above are mere examples and are not intended to limit the scope of the technology. It should be also appreciated that various omissions, replacements, and modifications may be made in the foregoing example embodiments described herein, without departing from the scope of the technology. The technology is intended to include such modifications and alterations in so far as they fall within the scope of the appended claims or the equivalents thereof.

For example, in the example embodiment and the modification examples described above, the stereo camera 11 and the camera 11B may capture images of the environment in front of the vehicle 10. However, this is a non-limiting example, for example. Alternatively, the stereo camera 11 and the camera 11B may capture images of an environment on a side or behind the vehicle 10, for example.

According to the image processing apparatus of at least one embodiment of the technology, it is possible to reduce the amount of computation.

It should be appreciated that the effects described herein are mere illustrative and non-limiting, and other effects may be made.

The processor 20 illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the processor 20. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the processor 20 illustrated in FIG. 1.

The invention claimed is:

1. An image processing apparatus comprising:
a first extractor configured to extract a first feature quantity of a captured image by inputting the captured image into a first neural network, the first neural network including a first plurality of convolutional layers and a first plurality of pooling layers configured to perform a plurality of convolutional and pooling operations to generate the first feature quantity, the captured image being one of a left image and a right image captured by a stereo camera mounted on a vehicle, the first feature quantity including image-wide features derived from entirety of captured image;

a first object identifier configured to identify a first object in the captured image on a basis of the first feature quantity;

a distance image generator configured to generate a distance image on a basis of the left image and the right image;

a region defining unit configured to define an image region in the captured image, wherein the image region corresponds to only a part of the captured image, and the image region is defined based on the distance image;

a second extractor configured to separately perform image processing on an image in the image region to extract a second feature quantity by inputting the image into a second neural network, the second neural network including a second plurality of convolutional layers and a second plurality of pooling layers configured to perform a plurality of convolutional and pooling operations to generate the second feature quantity, the second feature quantity being a region-specific local feature derived directly from the image region independently of the first feature quantity;

a selector configured to select, on a basis of data related to the image region defined by the region defining unit, a part of the first feature quantity, wherein the selection is based on at least one of (i) a location of the image region in the captured image and (ii) parallax values in the image region in the distance image, and the selected part represents contextual feature information relevant to the location or the parallax of the image region; and a second object identifier configured to identify a second object in the image region on a basis of both (1) the second feature quantity of the image in the image region and (2) the selected part of the first feature quantity selected by the selector, wherein the second object identifier performs recognition using a combination of the second feature quantity and the selected part of the first feature quantity, to enhance object identification accuracy in the image region.

2. An image processing apparatus comprising:

a first extractor configured to extract a first feature quantity of a captured image captured by a camera mounted on a vehicle by inputting the captured image into a first neural network, the first neural network including a first plurality of convolutional layers and a first plurality of pooling layers configured to perform a plurality of convolutional and pooling operations to generate the first feature quantity, the first feature quantity including image-wide features derived from entirety of the captured image;

a first object identifier configured to identify a first object in the captured image on a basis of the first feature quantity;

a region defining unit configured to define an image region in the captured image, wherein the image region corresponds to only a part of the captured image;

a second extractor configured to separately perform image processing on an image in the image region to extract a second feature quantity by inputting the image into a second neural network, the second neural network including a second plurality of convolutional layers and a second plurality of pooling layers configured to perform a plurality of convolutional and pooling operations to generate the second feature quantity, the second feature quantity being a region-specific local feature derived directly from the image region independently of the first feature quantity;

a selector configured to select, on a basis of data related to the image region defined by the region defining unit, a part of the first feature quantity that is related to the image region; and a second object identifier configured to identify a second object in the image region on a basis of both (1) the second feature quantity of the image in the image region and (2) the selected part of the first feature quantity selected by the selector, wherein the second object identifier performs recognition using a combination of the second feature quantity and the selected part of the first feature quantity, to enhance object identification accuracy in the image region, wherein the image processing apparatus is mountable on the vehicle, and wherein the region defining unit is configured to define, in the captured image, the image region in the vicinity of a region in which the vehicle is to travel.

3. The image processing apparatus according to claim 1, wherein the first extractor is configured to extract partial feature quantities by performing a convolutional computation multiple times, respectively, on a basis of the captured image and to output a plurality of partial feature quantities as the first feature quantity, and the selector is configured to select one or more of the partial feature quantities as the first feature quantity on the basis of the data related to the image region.

4. The image processing apparatus according to claim 2, wherein the first extractor is configured to extract partial feature quantities by performing a convolutional computation multiple times, respectively, on a basis of the captured image and to output a plurality of partial feature quantities as the first feature quantity, and the selector is configured to select one or more of the partial feature quantities as the first feature quantity on the basis of the data related to the image region.

5. The image processing apparatus according to claim 1, wherein the selector is configured to select a feature quantity corresponding to the image region, as the part of the first feature quantity.

6. The image processing apparatus according to claim 2, wherein the selector is configured to select a feature quantity corresponding to the image region, as the part of the first feature quantity.

7. An image processing apparatus comprising circuitry configured to:

extract a first feature quantity of a captured image by inputting the captured image into a first neural network, the first neural network including a first plurality of convolutional layers and a first plurality of pooling layers configured to perform a plurality of convolutional and pooling operations to generate the first feature quantity, the captured image being one of a left image and a right image captured by a stereo camera mounted on a vehicle, the first feature quantity including image-wide features derived from entirety the captured image;

identify a first object in the captured image on a basis of the first feature quantity;
generate a distance image on a basis of the left image and the right image,
define an image region in the captured image, wherein the image region corresponds to only a part of the captured image, and the image region is defined based on the distance image;
separately perform image processing on an image in the image region to extract a second feature quantity by inputting the image into a second neural network, the second neural network including a second plurality of convolutional layers and a second plurality of pooling layers configured to perform a plurality of convolutional and pooling operations to generate the second feature quantity, the second feature quantity is a region-specific local feature derived directly from the image region independently of the first feature quantity;
select, on a basis of data related to the image region defined, a part of the first feature quantity, wherein the selection is based on at least one of (i) a location of the image region in the captured image and (ii) parallax values in the image region in the distance image, and the selected part represents contextual feature information relevant to the location or the parallax of the image region; and
identify a second object in the image region on a basis of both (1) the second feature quantity of the image in the image region and (2) the selected part of the first feature quantity, wherein the second object identifier performs recognition using a combination of the second feature quantity and the selected part of the first feature quantity, to enhance object identification accuracy in the image region.

8. The image processing apparatus according to claim 1, further comprising a traveling information acquiring unit configured to acquire traveling data including a speed and a yaw rate of the vehicle,
wherein the region defining unit is further configured to:
determine a traveling direction of the vehicle based on the traveling data; and
identify a region corresponding to the traveling direction and define the region as the image region.

9. The image processing apparatus according to claim 2, further comprising a traveling information acquiring unit configured to acquire traveling data including a speed and a yaw rate of the vehicle,
wherein the region defining unit is further configured to:
determine a traveling direction of the vehicle based on the traveling data; and
identify a region corresponding to the traveling direction and define the region as the image region.

10. The image processing apparatus according to claim 7, wherein the circuitry is further configured to:
acquire traveling data including a speed and a yaw rate of the vehicle;
determine a traveling direction of the vehicle based on the traveling data; and
identify a region corresponding to the traveling direction and define the region as the image region.

\* \* \* \* \*